(12) United States Patent
Park et al.

(10) Patent No.: US 7,832,013 B2
(45) Date of Patent: Nov. 9, 2010

(54) METHOD FOR ANALYZING SECURITY GRADE OF INFORMATION PROPERTY

(75) Inventors: Won Joo Park, Daejeon (KR); Youn Seo Jeong, Daejeon (KR); Dong Il Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1260 days.

(21) Appl. No.: 11/081,501

(22) Filed: Mar. 17, 2005

(65) Prior Publication Data
US 2006/0080736 A1 Apr. 13, 2006

(30) Foreign Application Priority Data
Oct. 7, 2004 (KR) ................ 10-2004-0079857

(51) Int. Cl.
*G06F 11/00* (2006.01)
(52) U.S. Cl. ............... 726/25; 726/22; 713/181; 709/220; 709/229
(58) Field of Classification Search ............ 726/22–25; 706/8, 45; 709/204, 206–207, 224, 220, 709/229; 711/158; 713/181
See application file for complete search history.

(56) References Cited
U.S. PATENT DOCUMENTS

| 5,850,516 | A  | * | 12/1998 | Schneier ............... 726/25 |
| 6,883,101 | B1 | * | 4/2005  | Fox et al. .............. 726/25 |
| 6,931,434 | B1 | * | 8/2005  | Donoho et al. ......... 709/207 |
| 2004/0143753 | A1 | * | 7/2004 | Hernacki et al. ....... 713/200 |
| 2004/0230835 | A1 | * | 11/2004 | Goldfeder et al. ...... 713/201 |

FOREIGN PATENT DOCUMENTS

| KR | 1020020064639 | 8/2002 |
| KR | 1020040062735 | 7/2004 |

* cited by examiner

*Primary Examiner*—Thanhnga B Truong
(74) *Attorney, Agent, or Firm*—Lowe Hauptman Ham & Berner LLP

(57) ABSTRACT

A method for analyzing a security grade of an information property, and more particularly, a method by which a security grade (a risk degree in security) is analyzed objectively and quantitatively such that risk degree management of an information property can be efficiently performed, is provided. The method for analyzing a security grade of an information property includes: selecting an information property as an object of security grade analysis, among information properties for which risk degree analysis and importance evaluation in managerial, physical, and technological aspects are performed; calculating the property risk degree of the selected property based on the weighted mean of risk degrees and importance evaluation; and mapping the weighted mean of the risk degree and the importance on a 2-dimensional plane having the X-axis indicating the weighted mean of a risk degree and the Y-axis indicating importance, and based on the appearing result, determining the priority of a safeguard.

4 Claims, 2 Drawing Sheets

METHOD FOR ANALYZING SECURITY GRADE OF INFORMATION PROPERTY

BACKGROUND OF THE INVENTION

This application claims the priority of Korean Patent Application No. 10-2004-0079857, filed on Oct. 7, 2004, in the Korean Intellectual Property Office, the disclosure of which is incorporated herein in its entirety by reference.

1. Field of the Invention

The present invention relates to a method for analyzing a security grade of an information property, and more particularly, to a method by which a security grade (a risk degree in security) is analyzed objectively and quantitatively such that risk degree management of an information property can be efficiently performed.

2. Description of the Related Art

Thanks to recent rapid development of network and communications infrastructure, active utilization of information systems by public organizations as well as private companies has been rapidly increasing. In relation to this, there is a possibility that risk or weak points in security that can occur in a network environment or on the Internet can be misused by inside or outside malicious attackers.

Accordingly, there arises a necessity for identifying the possibility of this damage beforehand by accurately analyzing the risk degree of an information property in security, and for securing security to the maximum by preparing a preventive measure. However, at present when safeguards are applied, there are no accurate determination criteria on how high the security grade of a network is (AS-IS) and how high the security grade should be enhanced by applying safeguards (TO-BE).

With the risk degree analysis and weak point analysis methods suggest and performed so far, it is difficult to analyze a risk degree considering the technological area, the managerial area, and the physical area all together. When the number of properties is big, much time may be consumed for actual inspection of so many information properties, and there is a drawback that it is difficult to manage separately a part desired by an organization.

That is, when a predetermined company desires to intensively manage a technological weak point, if a risk analysis method is applied with collectively calculating physical and/or managerial risk degrees all together, the calculating and risk analysis evaluation time takes long each time, and there is a drawback that immediacy cannot be maintained. In particular, when a safeguard for information security is first applied, in many cases, it is difficult to evenly improve security in all aspects covering managerial, physical, and technological aspects. Accordingly, there arises a need for enabling selection of a security area regarded with higher importance by stage when a safeguard is employed.

SUMMARY OF THE INVENTION

The present invention provides a method by which a security grade (a risk degree in security) is analyzed objectively and quantitatively such that risk degree management of an information property can be efficiently performed.

According to an aspect of the present invention, there is provided a method for analyzing a security grade of an information property including: selecting an information property as an object of security grade analysis, among information properties for which risk degree analysis and importance evaluation in managerial, physical, and technological aspects are performed; calculating the property risk degree of the selected property based on the weighted mean of risk degrees and importance evaluation; and mapping the weighted mean of the risk degree and the importance on a 2-dimensional plane having the X-axis indicating the weighted mean of a risk degree and the Y-axis indicating importance, and based on the appearing result, determining the priority of a safeguard.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
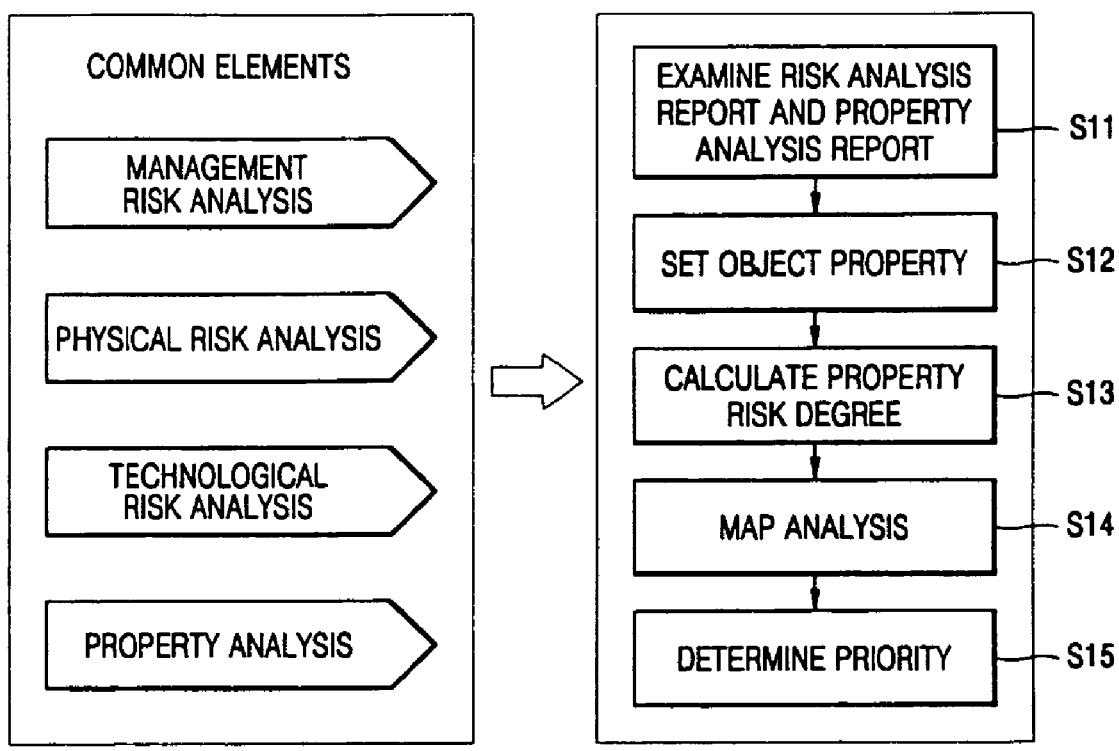
FIG. 1 is a flowchart of an embodiment of the present invention.

The present invention provides a method by which a system forming an information property is systematically analyzed and more objective and quantitative method is used such that risk degree analysis of an information property can be efficiently performed.

The attached drawings for illustrating preferred embodiments of the present invention are referred to in order to gain a sufficient understanding of the present invention, the merits thereof, and the objectives accomplished by the implementation of the present invention. Hereinafter, the present invention will be described in detail by explaining preferred embodiments of the invention with reference to the attached drawings. In the drawings, whenever the same element reappears in subsequent drawings, it is denoted by the same reference numeral.

FIG. 1 is a flowchart of an embodiment of the present invention.

Operation S11 for examining a risk analysis report and an information property analysis report should be performed before analysis of a security grade of an information property. In operation S11, the related risk degree of each property obtained as the analysis result of risk degrees in managerial, physical, and technological aspects based on the risk analysis report and information property analysis report, and the importance of each property appearing in property analysis results are examined, and by doing so, the list of properties, risk evaluation of each property and importance evaluation are examined and arranged.

Table 1 illustrates an example of items that can be shown in a risk analysis report and a property analysis report.

TABLE 1

| Classification | Sub-classification | | Check points | Weights |
|---|---|---|---|---|
| Managerial aspect | 1 | Password management | Minimum length of password, whether to set usage period | M |
| | 2 | Security patch | Whether to manage latest versions of OS and S/W | H |
| Physical aspect | 3 | Access permission | Whether to block physical access of unauthorized user | H |
| Technological | 4 | Password | Whether to set | M |

TABLE 1-continued

| Classification | Sub-classification | Check points | Weights |
|---|---|---|---|
| aspect | encryption 5 HTTP setting | password encryption Whether to remove service port when HTTP is not necessary | H |

Here, M denotes 'Medium' and H denotes 'High'.

The items shown in table 1 are just an example of general items, and can be modified in a variety of ways into an optimized security grade measuring checklist with respect to a corresponding organization and object apparatuses. Also, by considering the requirement of a security grade, characteristics of each device, and the number of devices items of approach method for grade measurement can be changed.

In operation S12 for selecting a property that is an object of security grade analysis, properties for which both risk degree analysis in managerial, physical, and technological aspects and property importance evaluation have been performed, are obtained from the information properties identified in operation S11 and object properties are selected. In order to select and analyze these object properties, when risk degree analysis in the managerial, physical, and technological aspects is performed, an information property management department, the physical location of an information property system, and technological inspection result and weak points should be obtained beforehand, and risk degree for each property should be calculated in advance as (H, M, L). Here, L denotes 'Low'.

In operation S13 for collectively calculating a property risk degree of a selected property as an object, the weighted mean of a risk degree of the object property in managerial, physical, and technological aspects and property importance are calculated according to a property risk total calculation formula. In a formula for obtaining the weighted mean of a risk degree, the risk degree (H, M, L) for each property calculated in the risk analysis report and information property analysis report is converted into 3 points, 2 points, or 1 point, and the weighted values in the managerial, physical, and technological aspects are counted as 3 points, 2 points, or 1 point in a three level point system. Then, the risk degree of each of the managerial, physical, and technological aspects is multiplied by each weighted value (W1, W2, W3), and by adding up the results and dividing by the sum of the weighted values (W1+W2+W3), the weighted mean is obtained. This can be expressed as the following equation 1:

$$\text{Weighted mean of risk degree} = [(\text{managerial risk degree} \times W1) + (\text{physical risk degree} \times W2) + (\text{technological risk degree} \times W3)]/[W1+W2+W3] \quad (1)$$

In order to evaluate the weighted mean of the risk degree of each property with considering property importance, a property risk total (property risk degree) is calculated by using the following equation 2:

$$\text{Property risk degree} = \text{weighted mean risk of each property} \times \text{importance of each property} \quad (2)$$

At this time, the importance of each property that is evaluated as class 1, class 2, or class 3, is converted into 3 points, 2 points or 1 point and applied to the formula to obtain the property risk degree.

Table 2 illustrates an example of the weighted mean of the risk degree of each property system and property importance.

TABLE 2

| Classification | Managerial risk item mean | Physical risk item mean | Technological risk item mean | W1 | W2 | W3 | Weighted mean of risk | Property importance |
|---|---|---|---|---|---|---|---|---|
| System A | 2.5 | 3 | 2.7 | 2 | 2 | 3 | 2.7 | H |
| System B | 2.1 | 2 | 2.8 | 3 | 2 | 3 | 2.3 | M |
| System C | 1.0 | 1 | 2.5 | 2 | 1 | 2 | 1.8 | M |

Examination item objects are selected according to the classification table with respect to security grade measurement shown in table 1, and the result according to property importance after the weighted mean of the risk of each system is calculated is shown in table 2. Table 2 shows the result of an example where with property systems A, B, and C as objects, weighted values in managerial, physical, and technological aspects are given as 1, 2, and 3 points, respectively, and then calculated.

In operation S14 for forming a map by reflecting the weighted mean of the risk degree and property importance, and analyzing the map, property importance and the weighted value of managerial, physical, and technological risk degrees are expressed by variable axes, and analysis is performed through mapping of an importance index and the weighted mean risk index on a 2-dimensional plane. Expressing the weighted mean of a risk degree obtained in operation S13 by the X-axis and the property importance by the Y-axis, map analysis for each property is performed. The weighted mean of the risk of an object system and property importance are calculated based on H, M, and L.

Figure 2:
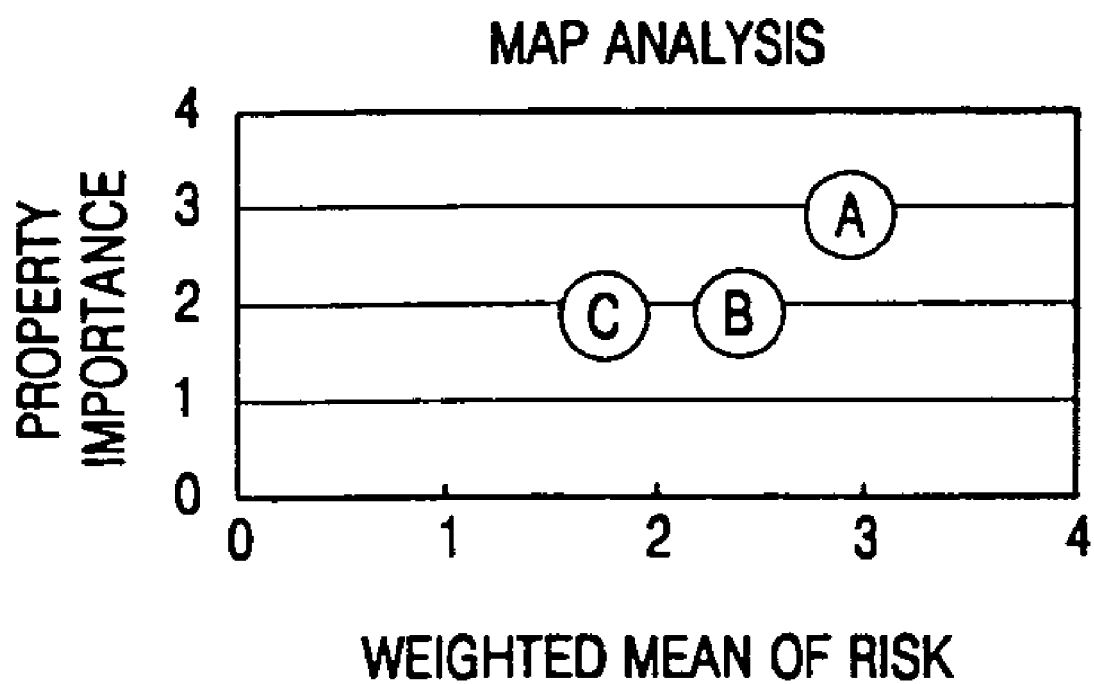
FIG. 2 illustrates an example of a map generated with property importance and the weighted mean of risk as variable axes.

FIG. 2 illustrates an example of a map generated with property importance and the weighted mean of risk as variable axes. FIG. 2 shows an example of a graph drawn based on the result shown in table 2, with the X-axis indicating the weighted mean of risk and the Y-axis indicating the property importance.

In operation S15 for determining the priority of a safeguard based on the location appearing through the map analysis, priority is set to be higher with the location moving to the right hand side or top side of the plane, by considering the property importance and the weighted mean of risk based on the location on the 2-dimenasional plane appearing through the map analysis.

A system located at the rightmost and top side, that is, a system with the highest priority, is the one that requires a safeguard first because the system with higher importance has a higher risk.

Table 3 illustrates an example showing a risk analysis result after through the map analysis the weighted mean of risk at the X-axis and the property importance at the Y-axis are multiplied to express the risk degree of a property as a number, and a priority for a safeguard is determined.

TABLE 3

| Classification | Risk analysis result | Priority |
| --- | --- | --- |
| System A | 8.1 | 1 |
| System B | 4.6 | 2 |
| System C | 3.6 | 3 |

Briefly speaking about the implementation process of the present invention, the importance of each property shown in a risk analysis report and an information property analysis is examined and arranged, and then, an operation for selecting properties that are objects of risk degree analysis is performed by selecting properties. The property risk degree is calculated based on the weighted mean of a risk degree in managerial, physical, and technological aspects of each of the selected properties, and property importance, and then, analysis through mapping the obtained weighted mean and property importance on a 2-dimensional map having variable axes indicating the weighted mean and property importance is performed. A process for determining a priority based on the result mapped in the map analysis is performed. At this time, when the risk of a property in each stage is analyzed and the total is calculated, the managerial, physical, and technological aspects are commonly handled to analyze the property.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

If the present invention is employed as described above, the risk degree of each property in the managerial, physical, and technological aspects and property importance can be reflected synthetically, and as a result, according to the selected security priority for each property, the direction of security measure implementation covering the entire organization can be examined.

Also, when investment in security is performed, by applying a safeguard with a priority according to the important property class obtained in property analysis, unnecessary investment can be prevented. That is, by relatively lowering the priority of a property not containing important information, the efficiency and effectiveness of security can be achieved.

In addition, in case of customer service devices, the operator should determine whether the operation policy of major service devices should be based on performance, or security. At this time, based on the property analysis and risk analysis, an operation policy first considering security can be applied to a location where properties with higher importance are disposed, and for properties with lower importance, performance can be first considered such that balanced system management is enabled.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for analyzing a security grade of an information property comprising:
   selecting the information property as an object of the security grade analysis, among information properties for which risk degree analysis and importance evaluation in managerial, physical, and technological aspects are performed;
   calculating a property risk degree of the selected information property based on the weighted mean of risk degrees and importance evaluation;
   mapping the weighted mean of the risk degrees and the importance evaluation on a 2-dimensional plane having the X-axis indicating the weighted mean of the risk degrees and the Y-axis indicating the importance evaluation; and
   determining a priority of a safeguard based on an appearing result from said mapping the weighted mean of the risk degrees and the importance evaluation,
   wherein the weighted mean of the risk degrees is calculated by giving different weighted values to each risk degree of managerial, physical, and technological aspects.

2. The method of claim 1, wherein the weighted mean of the risk degrees is calculated by adding the values obtained by giving the different weighted values and dividing the added value by a sum of the different weighted values.

3. The method of claim 1, wherein the property risk degree of the selected information property is obtained by multiplying each weighted mean of the risk degrees and the importance evaluation.

4. A method for analyzing a security grade of an information property comprising:
   selecting the information property as an object of the security grade analysis, among information properties for which risk degree analysis and importance evaluation in managerial, physical, and technological aspects are performed;
   calculating a property risk degree of the selected information property based on the weighted mean of risk degrees and importance evaluation;
   mapping the weighted mean of the risk degrees and the importance evaluation on a 2-dimensional plane having the X-axis indicating the weighted mean of the risk degrees and the Y-axis indicating the importance evaluation; and
   determining a priority of a safeguard based on an appearing result, wherein the priority of the safeguard is located on the right hand side or top side of the 2-dimensional plane if the priority is higher.

* * * * *